United States Patent [19]
Lorenz

[11] 3,782,122
[45] Jan. 1, 1974

[54] HEAT MOTOR
[75] Inventor: Jerome L. Lorenz, Columbus, Ohio
[73] Assignee: Ronco Incorporated, Columbus, Ohio
[22] Filed: Feb. 14, 1972
[21] Appl. No.: 225,953

[52] U.S. Cl. .................................................. 60/531
[51] Int. Cl. ........................................... F03g 7/06
[58] Field of Search ......................................... 60/25

[56] References Cited
UNITED STATES PATENTS
2,433,493  12/1947  Turner .................................... 60/25
3,443,383   5/1969  King ..................................... 60/25 X
3,670,495   6/1972  Leffert .................................... 60/25

Primary Examiner—Martin P. Schwadron
Assistant Examiner—Allen M. Ostrager
Attorney—Watts, Hoffmann, Fisher & Heinke

[57] ABSTRACT

A heat motor comprises a sealed fluid vaporizing and condensing chamber formed by the insides of a container having a bellows assembled therein to form a shiftable wall of the chamber. The bellows moves an actuator shaft in a power stroke upon increase in the vapor pressure of a volatile liquid inside the container and against a loading spring acting on the shaft. A screen wick extends along a substantial portion of the insides of the container and is saturated by a limited fill of the volatile liquid. One portion of the wick is heated by an electric heater to vaporize the liquid therein and the vaporized liquid condenses on the unheated portion of the wick and is transported by capillary attraction to the heated portion. The electric heater circuit is controlled in accordance with a command signal voltage so as to maintain a predetermined vaporizing temperature of the liquid corresponding to a given signal voltage whereby the vapor pressure in the chamber is controlled to maintain the actuator shaft in a predetermined position in its actuating stroke according to the signal.

18 Claims, 6 Drawing Figures

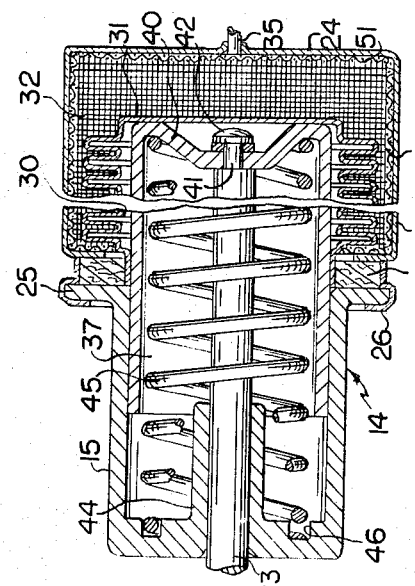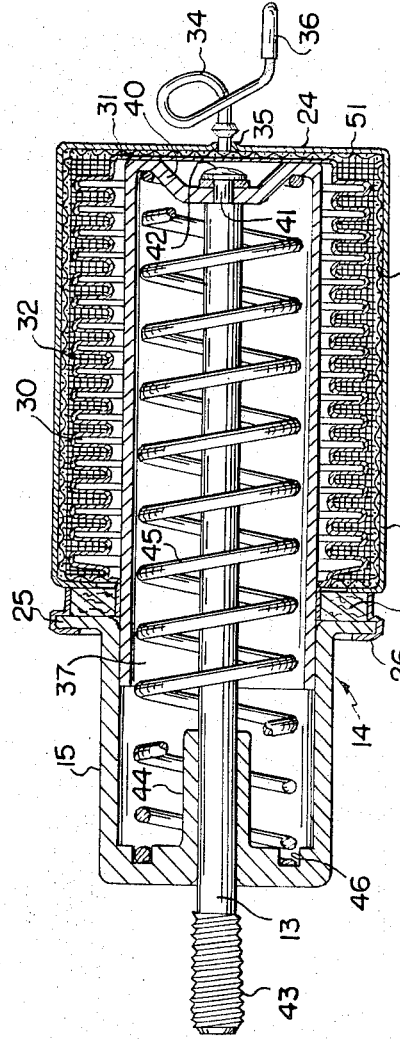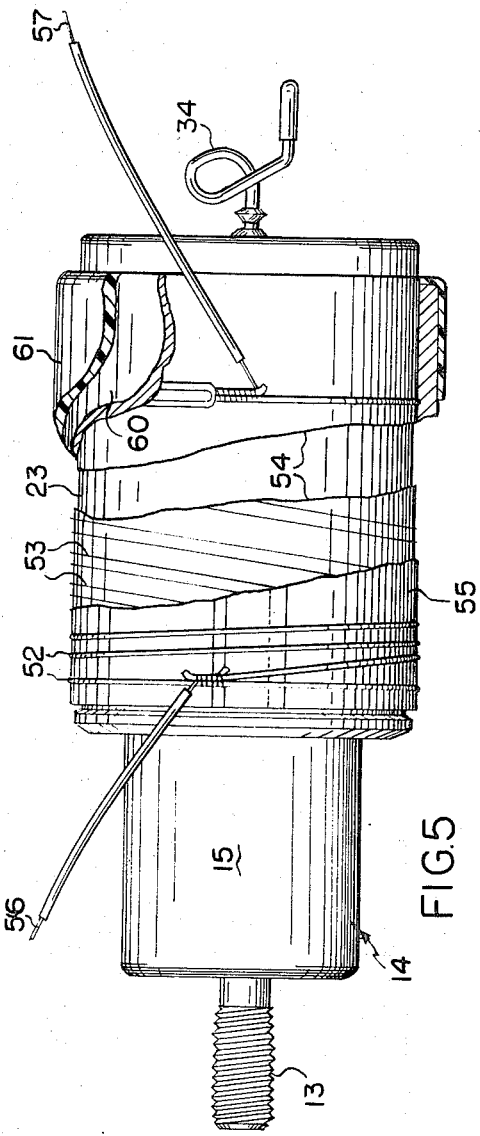

HEAT MOTOR

BACKGROUND OF THE INVENTION

The present invention relates to electro thermally operated heat motors or actuators which are adapted to produce powerful and relatively substantial movements of a control member in response to changes in a signal voltage or the like. Heat motors or actuators of the general type mentioned are well known and essentially they each comprise a movable shaft arranged to move axially in an actuating stroke to operate or control a device, such as a valve or louvers in an air circulating system. One end of the shaft is attached to a movable wall of an expandable chamber having a thermally responsive fluid or body arranged to act on the wall and move the shaft in one direction of its actuating stroke against a return force. The fluid is heated to cause expansion thereof by an electric heating element, the energization of which is suitably controlled to provide movement of the shaft. The shaft is moved in the opposite direction of its stroke by a spring or other loading device when the thermally responsive material reduces in temperature. Examples of actuators of the type mentioned are shown in U.S. Pat. Nos. 3,116,904; 3,256,686; 3,257,931; 3,374,337 and 3,443,383.

THE PRESENT INVENTION

One object of the present invention is to provide an improved heat motor of the type mentioned which is of relatively low cost and yet provides a relatively rapid, powerful and lengthy stroke of the actuator member and which shaft is accurately positioned in its actuating stroke in accordance with a given value of an electric command signal.

In carrying out the present invention an actuator of the general type mentioned utilizes a volatile liquid in a liquid vapor phase enclosed in a chamber having a wick extending about the insides and one end of the container, one portion of the wick being heated by an electric heater to vaporize liquid in the wick, the heater being isolated from a second portion of the wick whereby liquid vaporized in the heated portion of the wick condenses in the second cooler portion of the wick and is fed by capillary attraction to the heated portion of the wick for reevaporation.

The invention also contemplates a control circuit for the electric heater which energizes the heater to a degree corresponding to the value of a signal voltage whereby the vaporizing temperature of the liquid is regulated to cause the actuator shaft to be moved to and maintained in a given position in its actuating stroke corresponding to a given signal voltage.

Other objects and advantages of the invention will be apparent from the following description of a preferred form thereof, reference being made to the accompanying drawings wherein:

FIG. 3 is a sectional view taken substantially along line 3—3 of FIG. 2 and on a larger scale showing the power unit of the actuator independently of the housing and having certain parts thereof omitted;

FIG. 4 is a fragmentary view similar to FIG. 3 but showing the actuator shaft of the power unit in a different position;

FIG. 5 is a side view in elevation of the power unit shown in FIGS. 3 and 4 and including certain parts omitted in FIGS. 3 and 4, such parts being shown partly broken away.

Figure 1:
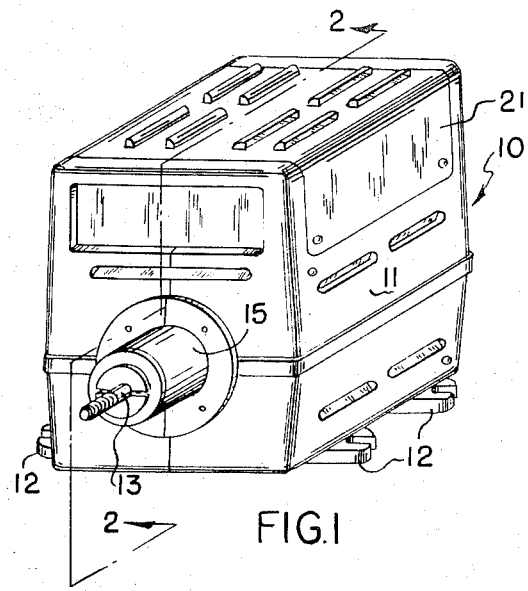
FIG. 1 is a perspective view of a heat motor or actuator embodying the invention and which is particularly suitable for actuating air louvers in an air duct system.

Referring to FIG. 1 of the drawings, a heat motor or actuator 10 is shown in a form particularly suitable for controlling the position of air flow control dampers in a heating and cooling system for a building or the like. The dampers and heating system are not shown as they do not constitute a part of the invention. The heat motor 10 is enclosed in a housing 11, which may be of a suitable cast material, having feet 12 by which the motor can be attached to a suitable support, not shown. The heat motor 10 includes an actuator shaft 13 which extends from one end of the housing 11 and which is adapted to reciprocate to position air dampers through suitable linkage, not shown. One feature of the heat motor is that the actuator shaft 13 can be maintained in various positions throughout its stroke according to the voltage of a signal transmitted from a remote point, such as a temperature responsive sensor affected by the temperature of air furnished through the duct system, as is described more fully hereinafter.

Figure 2:
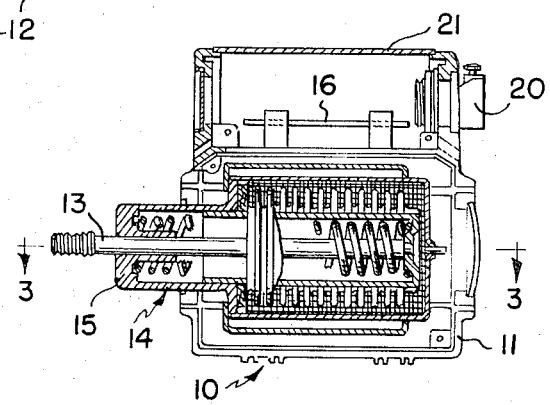
FIG. 2 is a sectional view of the actuator shown in FIG. 1 taken in the plane of line 2—2 of FIG. 1.
Figure 6:
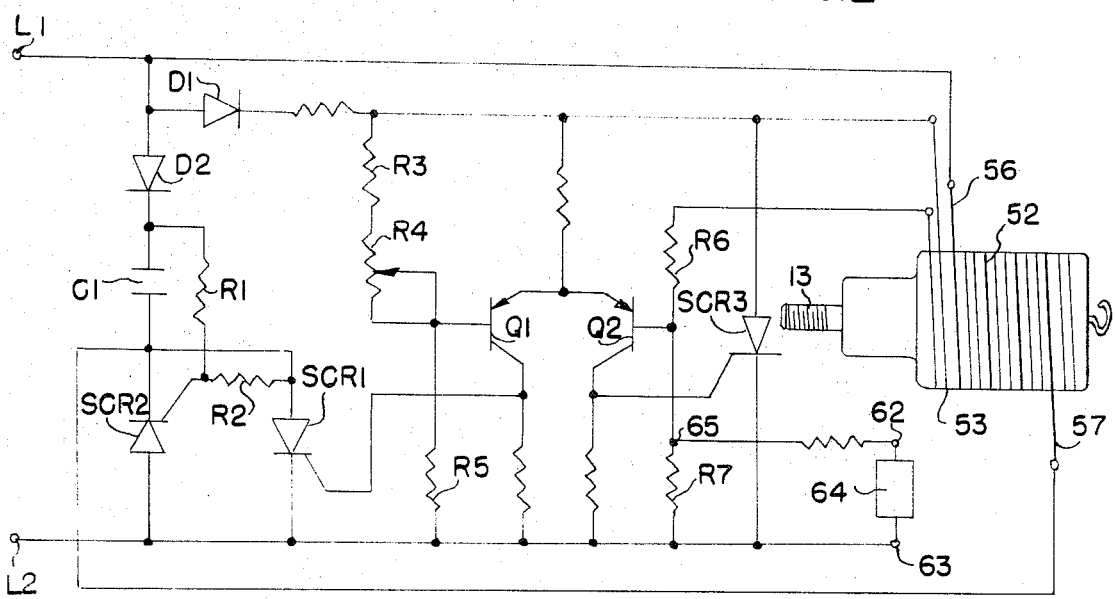
FIG. 6 is a wiring diagram of the control circuit for the heating element of the heat motor.

Referring more particularly to FIG. 2, a power unit 14, including the actuator shaft 13, is suitably supported inside the housing 11 with a neck portion 15 projecting through an opening in the housing. A circuit board 16 is supported by a bracket 17 above the power unit 14 and wiring, not shown, for the circuit on the board 16 may be brought into the housing 11 through a line connector assembly 20 supported on an end wall of the housing. The circuit board and its wiring is enclosed by a cover 21 suitably secured to the housing.

The power unit 14 is shown more clearly in FIGS. 3 to 5 and it comprises a cylindrical container 23 which is preferably formed of material having high heat conductivity. The container 23 includes an end wall 24 integral with the side walls. The neck member 15 is generally cylindrical and has an out-turned end flange 25 over which the end edges of the container 23 are crimped or rolled as shown at 26. Preferably, solder is utilized to provide a fluid tight seal between the container and the flange of the neck member.

A tubular metal bellows 30 is coaxially positioned inside the container 23. One end of the bellows 30 is closed by an integral wall 31 and is adjacent the end wall 24 of the container 23. The opposite end of the bellows 30 is open and the edge portions of the open end are suitably hermetically joined with the insides of the container wall so as to form a gas tight seal between the exterior of the bellows and the inside of the container 23. Preferably, a washer 33 of heat insulating material is interposed between the flange 25 of the neck member 15 and the end of the bellows adjacent the flange. The bellows 30 and insides of the container 23 form a sealed chamber 32 and the end wall 31 of the bellows forms a shiftable wall of the chamber 32 which moves axially of the container 23.

A small quantity of acetone or other suitable volatile liquid is sealed in the chamber 32. The acetone is introduced into the container 32 through capillary tube 34, one end of which is brazed to the edges of an extruded opening 35 in the end wall 24 of the container 23. After the acetone is introduced into the chamber, the tube is sealed by a cap 36. The quantity of acetone introduced into the chamber is preferably limited so that the vapor pressure is zero up to about 130°F., after which a liquid-vapor phase is present to at least 300°F. These temperature parameters could be altered, if desired.

One end portion of a rigid sleeve member 37 is slidingly received inside the neck member 15. The opposite end of the sleeve 37 has a transverse wall 40 which abuts the end wall 31 of the bellows 30. The central portion of the end wall 40 is dished and a necked end 41 of the actuator shaft 13 is extended through an opening in the wall and is secured in the opening by a head 42 formed thereon. The opposite end of the actuator shaft 13 is threaded at 43 for facilitating attachment of the shaft to damper operating linkage, not shown. The threaded end portion of the shaft 13 is guided in a bushing 44 formed on the neck member 15.

A compression spring 45 is disposed inside the sleeve 37 and surrounds the shaft 13. One end of the spring 45 is seated in an annular groove 46 formed in the end wall of the neck member 15 and the opposite end of the spring engages the end wall 40 of the sleeve 37. The tension of the spring 45 is such that at normal atmospheric temperatures the force or loading of the spring 45 on the bellows 30 will overcome the vapor pressure of the acetone in the chamber 32 and force the end wall 31 of the bellows to the end wall 24 of the container 23. The position of the sleeve 37 and bellows 30 is shown in FIG. 3. When the temperature of the acetone inside the chamber 32 is heated to a temperature of approximately 140°F. the vapor pressure acting on the bellows 30 is sufficient to shift the bellows wall 31 to the left against the force of spring 45. The slides the sleeve 37 and the actuator shaft 13 to the left, as is illustrated in FIG. 4. As the bellows wall 31 is shifted to the left the force of the spring 45 counteracting this movement increases as the spring is compressed. This increase in force requires a higher vapor pressure, and consequently temperature of the vapor to counterbalance the spring force. It will be apparent that the extent of movement of the actuator shaft 13 from the position shown in FIG. 3 will be a function of the highest temperature of the acetone liquid in the chamber 32. The travel of the sleeve 37 and shaft 13 to the left is limited by the end of the sleeve engaging the end wall of the neck member 15.

The acetone liquid in the chamber 32 is substantially contained in a wick. The wick comprises a cylinder of No. 100 mesh copper screen 50 lodged against the cylindrical inside walls of the container 23, and an end wall 51 of the wick lies against the inside of the end wall 24 of the container. The screen wick 50 has the capacity to cause liquid acetone to be transferred therealong by capillary attraction to feed liquid acetone portions of the wick from which acetone has been vaporized, the purpose of which will appear hereinafter.

The liquid acetone in the screen wick 50 is adapted to be heated and vaporized in the left-hand portion of the container 23 by an electric heating element 52. The energization of the element 52 is controlled by a bridge circuit including heat sensitive resistor wire 53 which is in close heat exchange relation with the container 23. The heating element 52 and resistor 53 are wound about the outside of the container 23 and insulated from the ambient air by suitable insulating material.

The outside of the end portion of the container 23 including the wall 24 is exposed to the ambient air. Thus, liquid acetone vaporized from the wick 50 by the heat from element 52 will condense on the portion 51 of the wick as the temperature of the latter portions will be substantially below the vaporizing temperature.

Referring to FIG. 5, the electric heater 52 and the resistance wire 53 are applied to the container 23 by first wrapping the portion of the container to be heated with a sheet of electrical insulating material 54 which is preferably of a plastic sheet known as Mylar. The resistance wire 53 in bifilar or doubled form is then spirally wound over the Mylar 54. A sheet 55 of electrical suitable insulating material is then applied over the resistance wire 53, after which the heater element wire 52 is wound about the insulating sheet 55. The heater wire 52 is provided with suitable circuit leads 56,57. A layer of heat insulation material 60 is then applied over the heater wire 52 and this assembly is then encased in a plastic sleeve 61.

When the heater 52 is energized sufficiently, liquid acetone in the wick 50 adjacent the heater will be vaporized producing a vapor pressure in the chamber 32 corresponding to the vapor pressure-temperature curve for acetone. As mentioned previously, the portion 51 of the wick 50 will be at a substantially lower temperature than the heated portion and vapor will condense thereon. As liquid acetone is vaporized from the wick additional liquid is fed thereto by capillary attraction from the condensate on the portion 51 of the wick.

Energization of the heater element is preferably governed by an electronic circuit which controls the heat produced by the element as a function of a D.C. analog condition responsive signal. The electronic circuit can be a phase angle control circuit or a time proportioning control circuit of any suitable construction. In the illustrated embodiment of the invention a time proportioning type control circuit governs energization of the heater 52.

In the illustrated embodiment of the invention, the heater element 52 is energized through a circuit which includes power conductors L1, L2 supplying 24 VAC. The terminal lead 56 of the heater element 52 is connected with the conductor L1 and the terminal lead 57 is connected with the conductor L2 through either of two solid state gated switches SCR1 and SCR2, depending upon the polarity of the AC source. The gate of the switch SCR1 is controlled by a differential amplifier comprised of two transistors Q1 and Q2. The emitters of the transistors Q1 and Q2 are connected with the conductor L1 through a half wave rectifier diode D1. The collector of the transistor Q1 is connected with the gate of the switch SCR1 and the collector of the transistor Q2 is connected with the gate of a gated electronic switch SCR3 which is adapted to conduct and shunt the transistors Q1, Q2 when a triggering voltage is applied to the gate thereof.

The differential amplifier input is furnished by a control circuit comprised of resistors R3, R4, R5 forming one branch of a Wheatstone bridge and drives the base of the transistor Q1. Resistors 53, R6, R7 comprise a second branch of the Wheatstone bridge and drives the base of the transistor Q2. A DC signal voltage is applied to a junction 65 by a command signal circuit 64, the details of which are not important to this disclosure and which is shown diagrammatically. The signal voltage across the signal circuit terminals 62, 63 is applied